(12) United States Patent
Boyden et al.

(10) Patent No.: US 7,966,637 B2
(45) Date of Patent: Jun. 21, 2011

(54) HARDWARE MODULE FOR ADDING FUNCTIONALITY TO TELEVISION

(75) Inventors: David Boyden, Escondido, CA (US); Peter Shintani, San Diego, CA (US); Kenichiro Toyoshima, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 549 days.

(21) Appl. No.: 11/782,078

(22) Filed: Jul. 24, 2007

(65) Prior Publication Data
US 2009/0031387 A1 Jan. 29, 2009

(51) Int. Cl.
- H04N 7/173 (2011.01)
- H04N 7/167 (2011.01)
- H04N 7/20 (2006.01)
- H04N 7/18 (2006.01)
- H04N 11/00 (2006.01)
- H04N 5/64 (2006.01)
- H04L 9/32 (2006.01)

(52) U.S. Cl. ............. 725/132; 725/31; 725/68; 725/85; 725/100; 725/131; 725/139; 725/143; 725/147; 725/149; 725/151; 348/552; 348/839; 380/200; 713/170

(58) Field of Classification Search ............... None
See application file for complete search history.

(56) References Cited

U.S. PATENT DOCUMENTS

| | | | | |
|---|---|---|---|---|
| 3,904,812 A | * | 9/1975 | Daffron | 174/549 |
| 4,567,511 A | * | 1/1986 | Smith et al. | 725/14 |
| 5,279,506 A | * | 1/1994 | Kawase et al. | 439/157 |
| 6,166,722 A | * | 12/2000 | Kawabe et al. | 345/169 |
| 2005/0027994 A1 | | 2/2005 | Sai | |
| 2005/0120384 A1 | | 6/2005 | Stone et al. | 725/132 |
| 2005/0144468 A1 | | 6/2005 | Northcutt et al. | |
| 2005/0190916 A1 | | 9/2005 | Sedacca | 380/239 |
| 2006/0005220 A1 | * | 1/2006 | Lee | 725/38 |
| 2006/0130082 A1 | * | 6/2006 | Chen | 720/649 |
| 2006/0239310 A1 | * | 10/2006 | Salz | 372/29.021 |
| 2006/0269056 A1 | * | 11/2006 | Montag | 380/205 |
| 2006/0285090 A1 | * | 12/2006 | Rodriguez, Jr. | 353/122 |
| 2007/0028260 A1 | | 2/2007 | Williams et al. | 725/31 |
| 2007/0055876 A1 | * | 3/2007 | Choi | 713/170 |
| 2007/0232132 A1 | * | 10/2007 | Ling et al. | 439/541.5 |
| 2008/0209479 A1 | * | 8/2008 | Zerr et al. | 725/80 |

FOREIGN PATENT DOCUMENTS

EP 1761052 A2 7/2007

OTHER PUBLICATIONS 2006 article entitled, "Low cost HDTV set-top box decoder for H.264/AVC and MPEG-2" http://www.st.com/stonline/products/literature/hd/11102.pdf.

* cited by examiner

Primary Examiner — Joseph P Hirl
Assistant Examiner — Mary Anne Kay
(74) Attorney, Agent, or Firm — John L. Rogitz

(57) ABSTRACT

A modular interface allows new functionalities to be added to a television receiver. A module can be added to the television receiver through the interface that will enable additional functionalities on the television. The interface allows copy protection of digital video and audio content by incorporating HDCP technology, thereby also allowing the manufacturer of the interface to control the access to the interface.

12 Claims, 3 Drawing Sheets

US 7,966,637 B2

HARDWARE MODULE FOR ADDING FUNCTIONALITY TO TELEVISION

FIELD OF THE INVENTION

The present invention relates generally to hardware modules for adding functionalities to devices such as televisions, DVD players, and the like.

BACKGROUND OF THE INVENTION

When a TV receiver is developed and released, not all functionality that might ever be desired of the TV can be included or even foreseen. For example, an improved video compression paradigm requiring a complementary decoder to play the video might be introduced after a TV is sold, in which case the TV would not have the requisite decoding capability to play video transmitted in the newer compression paradigm.

While some products may possess the capability to be remotely updated via a software update, a television might not have such a capability. Furthermore, simply updating a product with software or with a new interface has shortcomings, such as not being able to accommodate industry standards for copy protection and not possessing innate mechanisms to restrict access to the interface, which is otherwise required to prevent unapproved devices from being attached to the interface. Accordingly, as recognized herein it is desirable to provide a means for a TV owner to add omitted functionality to the TV while providing the interface to do so with a mechanism for ensuring that only approved devices may be connected.

SUMMARY OF THE INVENTION

A module is disclosed for adding functionality to a component such as a TV that is to be augmented with the functionality. A module housing holds components facilitating the functionality, and a high definition multimedia interface (HDMI) connector is supported by the housing and is connectable to a cable connector for establishing a pathway for communication to the component to be augmented. Valid communication between the module and the component to be augmented is permitted only if a key selection vector (KSV) stored in one of the module or component to be augmented is on a list of KSVs stored in the other of the module or component to be augmented. The functionality may be, e.g., video decoding functionality provided by the module but not by the TV.

In a non-limiting embodiment the module is formed with a connector bay and at least one HDMI connector is disposed in the bay. The module is also formed with plural guide holes. The HDMI connector mates with a complementary cable connector held in a plastic structure in which opposed arms extend laterally away from the cable connector and terminate in respective guides that are configured for engaging respective guide holes in the module to facilitate engagement of the connectors.

In another non-limiting embodiment a dead air space for receiving a cable connecting the module to the component to be augmented is formed between the module and the component to be augmented when the module is engaged with the component to be augmented to allow for an appropriate bend radius of the cable. In specific embodiments the module may include a box-like portion holding interior components and a flat plate-like shelf extending away from the portion. The shelf is not as thick as the portion so that when the portion is flush against a receptacle of the component to be augmented the shelf extends above a floor of the receptacle with an end of the shelf abutting a raised part of the component to be augmented to establish the dead air space.

In yet another non-limiting embodiment the module can include a parallelepiped-shaped module body formed with an elongated groove sized and shaped receive a HDMI cable with male HDMI connector end. A female HDMI connector is disposed in the groove to mate with the male HDMI connector end of the cable.

In another aspect, a hardware module is disclosed that includes components for providing add-on functionality to a component to be augmented that is physically separate from the module and connectable thereto by a cord. The module communicates with the component to be augmented using an interface restriction from the group of restrictions consisting of: HDMI and/or High Definition Content Protection (HDCP), digital transmission content protection (DTCP) certificate.

In still another aspect, a system for adding a functionality includes a TV not having the functionality and module means connectable to the TV and having the functionality. The module means include a housing incorporating one or more of means for guiding arms of a connector structure holding a connector, dead air means for accommodating a cable connecting the module and the TV, and groove means for accommodating a cable connecting the module and the TV.

DETAILED DESCRIPTION OF THE PREFERRED EMBODIMENT

Figure 1:
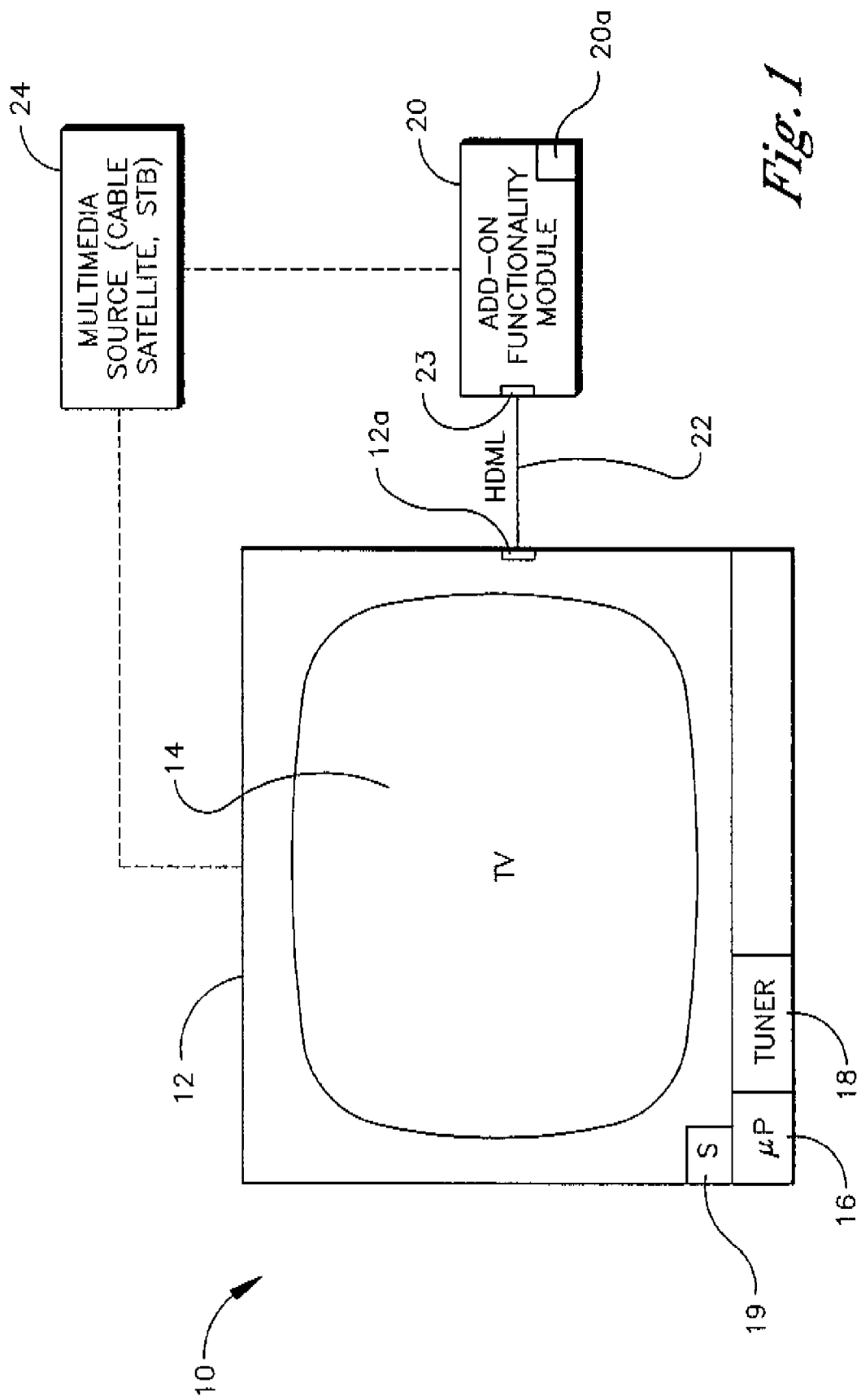
FIG. 1 is a block diagram of a non-limiting system in accordance with present principles.

Referring initially to FIG. 1, a system is shown, generally designated 10, which can include a TV 12 with video display 14 such as a flat panel matrix display or other TV display, a TV processor 16, and a TV tuner 18. The display 14 is caused by the TV processor 16 to display TV signals as selected by the TV tuner 18. Also, the TV 12 may have a data storage 19 such as but not limited to an extended display identification data (EDID) electrically erasable programmable read only memory (EEPROM).

The TV 12 is also associated with one or more communication interfaces 12a. In one non-limiting implementation the interface 12a, which can be an Internet Protocol television (IPTV) receiver, codec, or other module, is a HDMI-based interface that may include hardware and software embodying a HDMI transmitter (for sending signals to a set-top box or disk player or other source) and HDMI receiver (for receiving signals from a source). Plural HDMI connectors may be provided. The interface 12a may be physically implemented within the housing of the TV 12 or it may be external thereto. The interface 12a may include its own storage such as an EEPROM or one-time programming (OTP) ROM. It is to be understood that while FIG. 1 shows various storages, the information disclosed below may be stored in one common storage or in a storage associated with only the TV 12 or only with the interface 12a. In any case, as shown the interface 12a is the communication interface between the TV 12 and an add-on functionality module 20.

More specifically, as shown in FIG. 1 an add-on functionality module 20 with internal components 20a such as circuits for facilitating the functionality can be connected to the TV 12 by a connector cable 22 such as a High Definition Multimedia Interface (HDMI) cable. Board-to-board interfaces can be used. The add-on functionality module 20 may include hardware and/or software not included in the TV 12 but desired by a user of the TV 12. For instance, the module 20 may include a video decoder or other function that is not otherwise included in the TV 12. The module 20 has an interface 23 that is complementary to the interface 12a of the TV 12.

The signals to be displayed on the TV 12 can come from a multimedia source 24 such as a set-top box, a cable head end, a satellite source, a disk player, an Internet site, etc. The multimedia source 24 may be connected to the TV 12 directly and/or to the TV 12 via the module 20 as shown.

Accordingly, it may now be appreciated that the module 20 can piggyback on an existing interface restriction, such as the restrictions imposed by High Definition Content Protection (HDCP) (i.e., that only modules 20 with licensed HDCP key selection vectors (KSVs) can communicate with TVs 12 that also must have licensed KSVs.) The present invention does this by restricting access to a TV 12 that might incorporate HDMI/HDCP to only those modules 20 that possess KSVs that have been placed on a list approved by, e.g., the vendor of the TV 12, with the list being stored in, e.g., the storage 19 of the TV 12 and/or downloaded from a server such as an Internet server to the module or TV.

Present principles apply not only to the HDMI/HDCP interface but can also be used with other interfaces. For example, the invention can be used with a vendor module incorporating a IEEE-1394 interface, in which case the encryption information can include a digital transmission content protection (DTCP) certificate. Moreover, the inverse of the above restriction can also be true, i.e., a vendor of a monitor 20 can use present principles to restrict access to a module 20 to only TVs from approved manufacturers. Other interfaces additionally or alternatively may be used, e.g., universal serial bus (USB) to provide a copy protectable video path, bi-directional control signal path, power and controllable access.

While the above disclosure focuses on an example implementation in which the module 20 is used to augment the functionality of a TV 12, it is to be understood that the module 20 may also be used to augment the functionality of other components, e.g., set top boxes, DVD players, personal computers, etc. For example, as has been postulated in the case of a TV, a DVD player and/or a PC may not have the capability to support some new and future video and/or audio compression system. The module 20 can thus be connected to a PC or DVD to facilitate the support of a future compression algorithm.

In any case, to provide an illustration of the purpose of the module 20, if the source 24 is connected to the module 20 to deliver video that is transmitted using a compression algorithm requiring a decoder not possessed by the TV 12 to play the video, the module 20 can be provided with the decoder, decode the video, and then send the decoded video to the TV 12 for playing the video.

Figure 2:
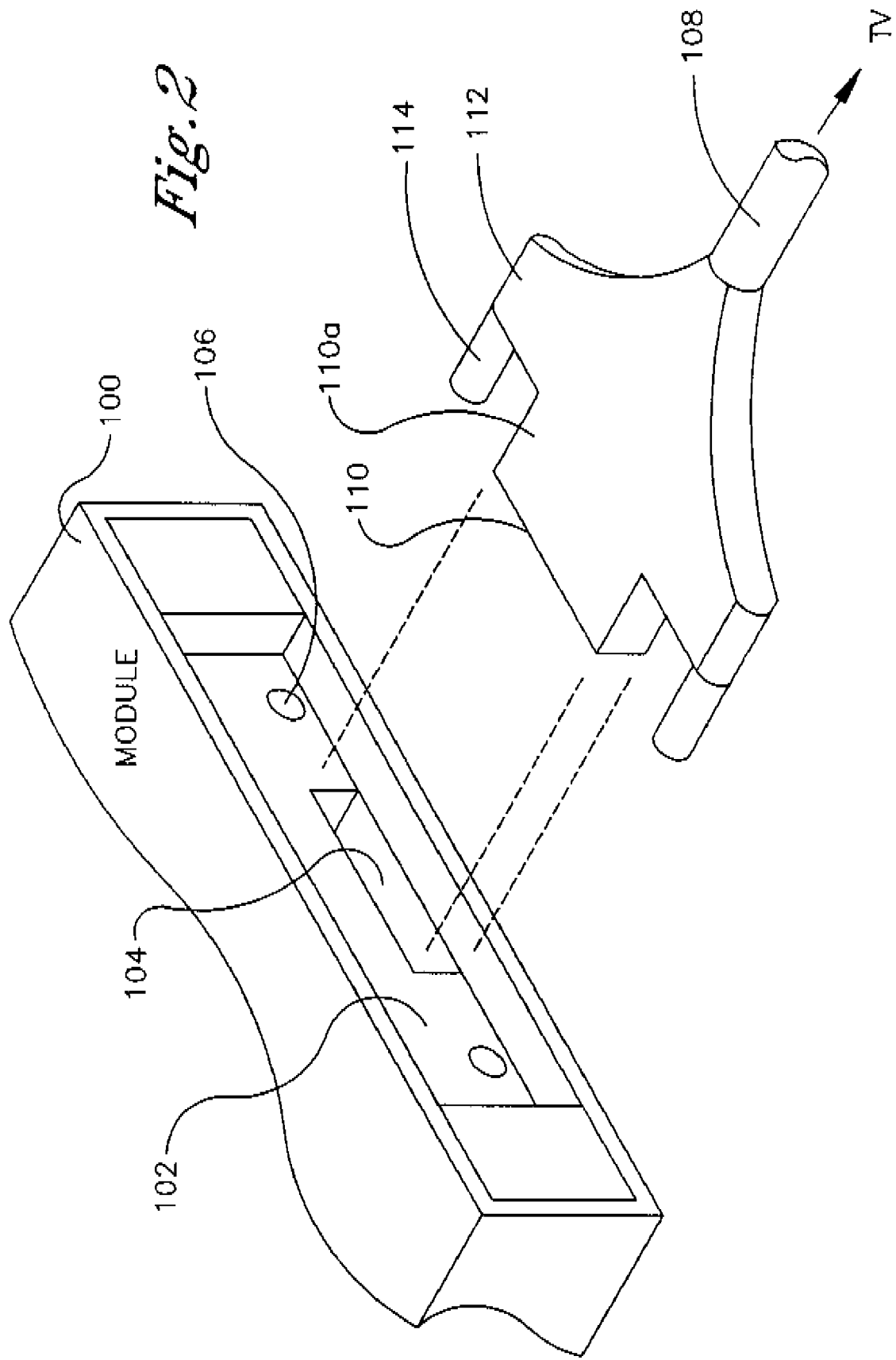
FIG. 2 is an exploded perspective view of an example module in accordance with present principles and accompanying TV HDMI connector, with portions of the cable and module broken away for clarity.

Turning to FIG. 2, an example module 100 is illustrated of the module 20 shown in FIG. 1. The module 100 can be formed with a connector bay 102 that can be a parallelepiped-shaped cavity in the housing of the module 100 as shown. One or more electrical connectors 104 such as a type A, B, or C HDMI female connector may be disposed in the bay 102 on, e.g., an interior wall thereof as shown. Also, in the example shown in FIG. 2 the bay 102 and in particular the interior wall thereof can be formed with two guide holes 106 that straddle the connector 104 for purposes to be shortly disclosed.

The module 100 may be electrically connected to the TV 12 shown in FIG. 1 by means of a cord 108, one end of which (not shown) is connected to the TV 12 and the other end of which may terminate in a connector 110, such as a male HDMI connector, that is configured for mating with the connector 104 of the module 100. The male connector 110 may be held in a plastic overmold structure 110a, and in the example shown in FIG. 2 opposed arms 112 that can be integral to the overmold structure 110a extend laterally away from the connector 110. Each arm 112 terminates in a respective guide 114 that is oriented perpendicularly to the arm 112 and that is configured for engaging a respective guide hole 106 in the module 100 to facilitate engagement of the connectors 104, 110 by "feel". Thus, the blind alignment of the module's connector 104 to the cable assembly connector 110 is facilitated. The guide structure described above facilitates the use of standard HDMI connectors, which may carry not only HDMI-HDCP but also in some implementations USB and/or Ethernet plus power.

Figure 3:
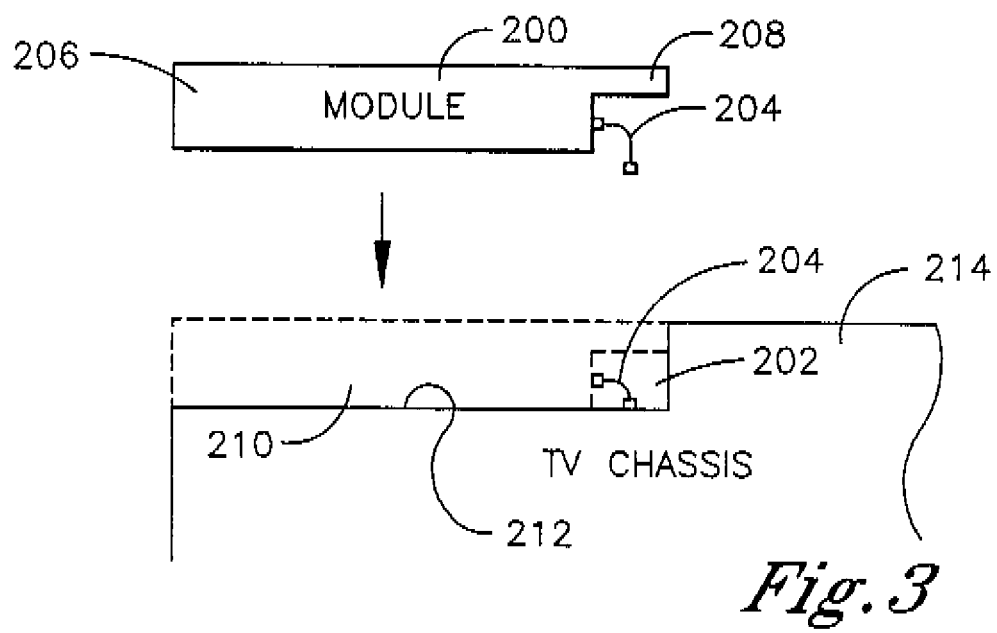
FIG. 3 is an exploded side view of an example module and TV chassis in which a dead space is provided to accommodate a HDMI cable.

FIG. 3 shows an implementation 200 of the module 20 shown in FIG. 1 in which a HDMI connector is used without any brackets, to facilitate the use of off-the-shelf components and cables. This is supported by including a dead air space 202 in the mechanical arrangement between the module 200 and the TV 12 chassis. This dead space 202 allows for an appropriate bend radius of the HDMI, USB and power cables, collectively labeled 204 in FIG. 3. Depending upon the application, the power carried within the USB cable may be sufficient.

With more specificity, the module 200 may include a box-like portion 206 that holds the interior components of the module 200 and a flat plate-like shelf 208 extending away from the portion 206. The shelf 208 is not as thick as the portion 206 as shown in side view, so that when the portion 206 is flush against a receptacle 210 of the TV chassis, the shelf 208 extends above the floor 212 of the receptacle 210, with the end of the shelf 208 abutting a raised part 214 of the TV chassis as shown to establish a substantially enclosed dead air space 202 in which the cable(s) 204 are disposed. The top surfaces of the shelf 208, box-like portion 206, and raised part 214 can be flush with each other as shown.

Figure 4:
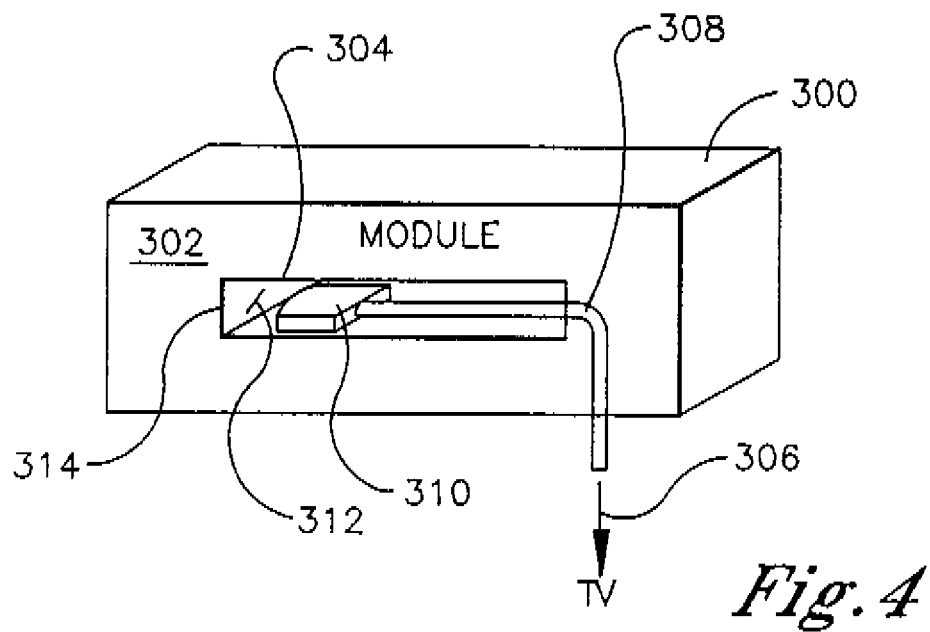
FIG. 4 is a perspective view of an example module with a cable channel for accommodating a connector cable.

FIG. 4 shows another example 300 of the module 20 shown in FIG. 1 that is configured to facilitate use of off-the-shelf HDMI cabling and connectors. As shown, a parallelepiped-shaped module body 302 is formed with an elongated groove 304 on the side of the module 300 that is intended to face the TV chassis as indicated by the arrow 306. The groove 304 is sized and shaped receive a HDMI cable 308 with male HDMI connector end 310. A female HDMI connector 312 is disposed preferably at one end 314 of the groove 304 to mate with the male HDMI connector end 310 of the cable 308, the opposite end of which is attached to the TV. The groove 304 and recessed female connector 312 allow for a convenient and space-saving lead dressing for the interconnecting HDMI cable 308.

While the particular HARDWARE MODULE FOR ADDING FUNCTIONALITY TO TELEVISION is herein shown and described in detail, it is to be understood that the subject matter which is encompassed by the present invention is limited only by the claims. For instance, a module of the invention may comprise one, two, or all of the features shown in the figures.

What is claimed is:

1. A module for adding functionality of video decoding to a video display device, the module comprising:
the video decoding functionality provided by the module but not by the video display device;
a module housing for holding components facilitating the video decoding functionality; and
at least one high definition multimedia interface (HDMI) connector supported by the housing and connectable to a connector for establishing a pathway for communication to the video display device,
wherein valid communication between the module and the video display device is permitted only if a key selection vector (KSV) stored in one of the module or the video display device is on a list of KSVs stored in the other one of the module or the video display device,
a dead air space formed by a mechanical arrangement between the module and the video display device,
the module including a box-like portion that holds interior components of the module and a flat plate-like shelf extending away from the portion, the shelf not being as thick as the portion so that when the portion is flush against a receptacle of the video display device, the shelf extends above a floor of the receptacle, with an end of the shelf abutting a raised part of the video display device to establish the dead air space in which a cable connecting the module to the video display device is disposed and is connected to the floor of the receptacle, top surfaces of the shelf, box-like portion, and raised part being flush with each other.

2. The module of claim 1, wherein a dead air space for receiving a cable connecting the module to the video display device is formed between the module and the video display device when the module is engaged with the video display device to allow for an appropriate bend radius of the cable.

3. The module of claim 2, wherein the module includes a box-like portion holding interior components and a flat plate-like shelf extending away from the portion, the shelf not being as thick as the portion so that when the portion is flush against a receptacle of the video display device wherein the shelf extends above a floor of the receptacle with an end of the shelf abutting a raised part of the video display device to establish the dead air space.

4. The module of claim 1, wherein the module includes a parallelepiped-shaped module body formed with an elongated groove sized and shaped receive a HDMI cable with male HDMI connector end, a female HDMI connector being disposed in the groove to mate with the male HDMI connector end of the cable.

5. A hardware module including components for providing the add-on video decoding functionality to a component to be augmented that is physically separate from the module and connectable thereto by a cord, the module communicating with the component to be augmented using an interface restriction from the group of restrictions consisting of:
HDMI and/or High Definition Content Protection (HDCP),
digital transmission content protection (DTCP) certificate, universal serial bus (USB) restriction,
wherein the video decoding functionality provided by the module but not by the component to be augmented,
a dead air space being formed by a mechanical arrangement between the module and the component to be augmented, the module including a box-like portion that holds interior components of the module and a flat plate-like shelf extending away from the portion, the shelf not being as thick as the portion so that when the portion is flush against a receptacle of the component to be augmented, the shelf extends above a floor of the receptacle, with an end of the shelf abutting a raised part of the component to be augmented to establish the dead air space in which a cable connecting the module to the component to be augmented is disposed and is connected to the floor of the receptacle, top surfaces of the shelf, box-like portion, and raised part being flush with each other.

6. The module of claim 5, wherein valid communication between the module and the component to be augmented is permitted only if a key selection vector (KSV) stored in one of the module or component to be augmented is on a list of KSVs stored in the other of the module or component to be augmented.

7. The module of claim 5, wherein the component to be augmented is a TV.

8. The module of claim 5, wherein the module is formed with a connector bay and at least one HDMI connector is disposed in the bay, the module being further formed with plural guide holes, the HDMI connector mating with a complementary cable connector held in a plastic structure, opposed arms extending laterally away from the cable connector and terminating in respective guides configured for engaging respective guide holes in the module to facilitate engagement of the connectors.

9. The module of claim 5, wherein a dead air space for receiving a cable connecting the module to the component to be augmented is formed between the module and the component to be augmented when the module is engaged with the component to be augmented to allow for an appropriate bend radius of the cable.

10. The module of claim 9, wherein the module includes a box-like portion holding interior components and a flat plate-like shelf extending away from the portion, the shelf not being as thick as the portion so that when the portion is flush against a receptacle of the component to be augmented the shelf extends above a floor of the receptacle with an end of the shelf abutting a raised part of the component to be augmented to establish the dead air space.

11. The module of claim 5, wherein the module includes a parallelepiped-shaped module body formed with an elongated groove sized and shaped receive a HDMI cable with male HDMI connector end, a female HDMI connector being disposed in the groove to mate with the male HDMI connector end of the cable.

12. A system for adding video decoding functionality, comprising:
a TV not having the video decoding functionality;
a module connectable to the TV and having the video decoding functionality, the module including a housing, the housing incorporating dead air means for accommodating a cable connecting the module and the TV, the dead air means being established at least in part by a dead air space formed by a mechanical arrangement between the module and the TV, the module including a box-like portion that holds the interior components of the module and a flat plate-like shelf extending away from the portion, the shelf not being as thick as the portion so that when the portion is flush against a receptacle of the TV, the shelf extends above a floor of the receptacle, with an end of the shelf abutting a raised part of the TV to establish the dead air space in which the cable is disposed and is connected to the floor of the receptacle, top surfaces of the shelf, box-like portion, and raised part being flush with each other.

* * * * *